United States Patent [19]

Babb et al.

[11] 4,326,955
[45] Apr. 27, 1982

[54] HEMODIALYSIS WITH SODIUM BICARBONATE DIALYSATE PREPARED IN PLURAL STAGES

[75] Inventors: Albert L. Babb; Belding H. Scribner, both of Seattle, Wash.

[73] Assignee: Diachem, Inc., Arlington Heights, Ill.

[21] Appl. No.: 209,742

[22] Filed: Nov. 24, 1980

Related U.S. Application Data

[63] Continuation-in-part of Ser. No. 48,575, Jun. 14, 1979, abandoned.

[51] Int. Cl.³ .............................................. B01D 13/00
[52] U.S. Cl. ..................................... 210/638; 210/646
[58] Field of Search ............... 210/638, 639, 646, 647, 210/321.1–321.5

[56] References Cited

U.S. PATENT DOCUMENTS 3,847,809  11/1974  Kopf ..................................... 210/22
3,962,075   6/1976  Fialkoff et al. ........................ 210/22
4,153,554   5/1979  von der Heide et al. ....... 210/96 M

OTHER PUBLICATIONS

Kolff, W., "Dialysis in Treatment of Uremia", Archives of Internal Medicine, vol. 94, No. 1, pp. 142–160, 1954.
Gonzalez, F. et al., "Effects of Acetate During Hemodialysis", Trans. Am. Soc. Art. Int. Organs, vol. 20, 1974, pp. 169–174.
Srimsrud, L. et al., "Continuous Preparation of Hemodialysis Fluid", Trans. Am. Soc. Art. Int. Organs, vol. 10, 1964, pp. 107–109.
Kirkendol, P. et al., "A Comparison of Cardiovascular Effects of Sodium Acetate", Trans. Am. Soc. Art. Int. Organs., vol. 23, 1977, pp. 399–404.
Graefe et al., "Less Dialysis–Induced Morbidity . . . with Bicarbonate in Dialysate", Ann. of Medicine, Mar. 1978, vol. 8, No. 3, pp. 333–336.
Babb et al., "The Genesis of the Square Meter–Hour Hypothesis", Trans. Am. Soc. Art. Int. Organs, vol. 17, 1971, pp. 81–91.

*Primary Examiner*—Charles N. Hart
*Assistant Examiner*—David R. Sadowski

[57] ABSTRACT

A dialysate solution containing sodium bicarbonate is provided in which the sodium bicarbonate is generated just prior to dialysis by combining an aqueous sodium carbonate-containing stream with an aqueous stream containing hydrochloric acid, acetic acid or a mixture of these acids in at least two stages with an excess of acid in the first stage.

11 Claims, 1 Drawing Figure

U.S. Patent
Apr. 27, 1982
4,326,955
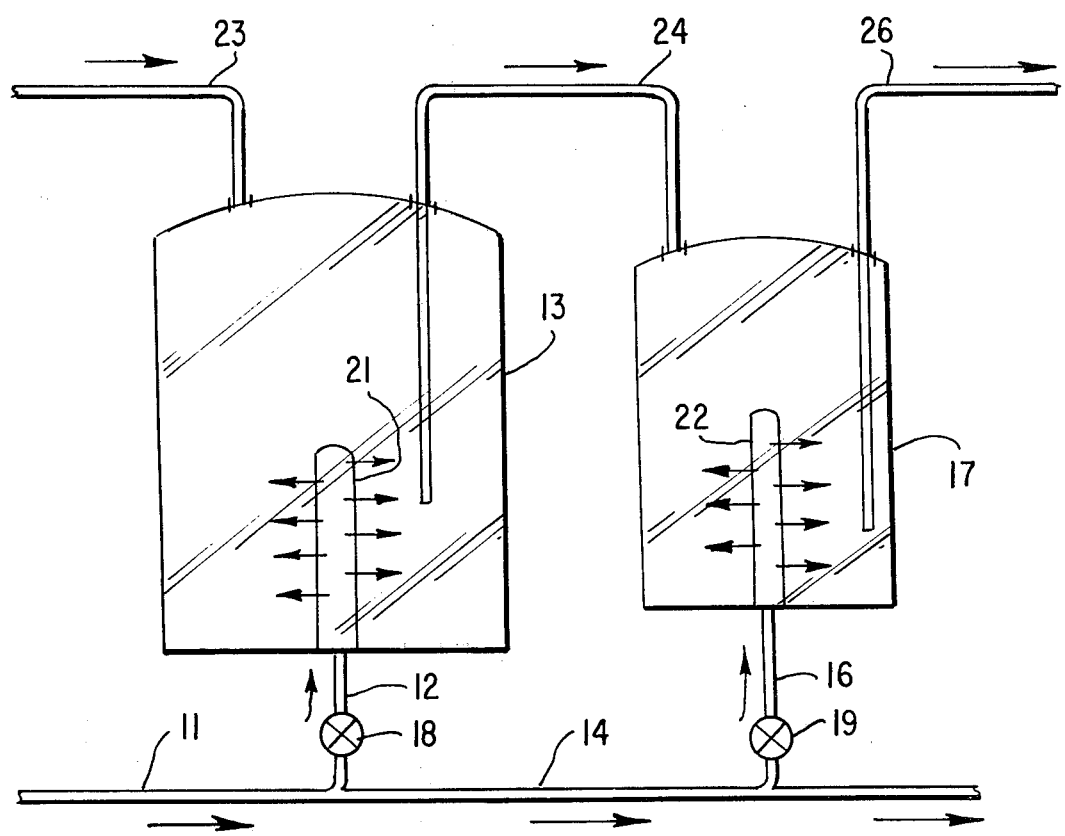

HEMODIALYSIS WITH SODIUM BICARBONATE DIALYSATE PREPARED IN PLURAL STAGES

CROSS-REFERENCE TO RELATED APPLICATION

This application is a continuation-in-part of our Application Ser. No. 048,575, filed June 14, 1979 now abandoned.

FIELD OF INVENTION

This invention relates to hemodialysis, and particularly to processes wherein the blood of a patient is dialyzed over a semipermeable membrane opposite a dialysate liquid containing sodium bicarbonate, as well as other compounds, such as calcium chloride, and is then returned to the patient. BACKGROUND OF THE INVENTION Dialysis processes for the treatment of patients with kidney malfunction are coming into wider and wider use as more and more dialysis equipment becomes available. Dialysis processes are literally life-saving processes, but sometimes produce adverse secondary effects, such as fatigue and nausea. To reduce the adverse side effects and for other reasons, experimental work on the parameters of the process is being carried out, including investigation to improve the composition of the dialysate liquid.

Dialysate liquids must contain an alkalizing salt, and sodium bicarbonate was used in the early days of dialysis development as the alkalizing agent. Later, sodium acetate was substituted for sodium bicarbonate as an alkalizing agent, and today's dialysis solutions usually contain sodium acetate. Sodium acetate solutions are more easily maintained than sodium bicarbonate solutions in a state of sterility; sodium acetate metabolizes in the bloodstream to sodium bicarbonate.

Graefe et al., in an article entitled "Less Dialysis-Induced Morbidity and Vascular Instability with Bicarbonate in Dialyzate," published in Annals of Internal Medicine 88:332–336, 1978, disclose that sodium bicarbonate-containing dialysate fluid produces less nausea, headache, vomiting, post-dialysis fatigue, hypo-tension, disorientation and dizziness then sodium acetate-containing fluid when used in a high-efficiency large-surface-area dialyzer. A beneficial effect of sodium bicarbonate-containing dialysates in reducing incidence of atherosclerosis is recognized in Kluge et al. Int. Soc. Art. Org. 3A, p. 23 (April 1979).

These articles would suggest that sodium bicarbonate, rather than sodium acetate, should be the alkalizer of choice in dialysate liquids. However, sodium bicarbonate solutions are more difficult to use because sodium bicarbonate solutions are not bacteriostatic and thus may present sterility problems.

Aqueous sodium bicarbonate solutions, unlike aqueous sodium acetate solutions, are not self-sterilizing and cannot be prepared in advance of their use for dialysis. Common infectious organisms can survive and proliferate in sodium bicarbonate solutions; and infection of the patient is thus possible when there is even a minor and inadvertent departure from sterile technique in the handling of the dialysis process.

SUMMARY OF THE INVENTION

In accordance with the present invention a dialysis process is provided in which bicarbonate ions are generated on demand in at least two stages from two bacteriostatic, stable aqueous solutions. In particular, sodium bicarbonate is the alkalizing medium and is generated in situ prior to passage of the dialysate solution over the dialysis membrane surface by the interaction of a stream of an aqueous solution containing dissolved sodium carbonate and a stream of an aqueous solution containing a dissolved acid of the group consisting of hydrochloric acid (HCl), acetic acid (HAc) and mixtures thereof, said streams interacting in a first stage in which a stoichiometric excess of acid is provided and in at least one additional stage in which additional aqueous sodium carbonate solution is provided.

This invention can be practiced using presently known dialysis equipment in conjunction with a dialysate compounded in at least two stages from two or three previously prepared bacteriostatic solutions. In this manner prolonged existence of sodium bicarbonate in the dialysate liquid prior to use is avoided, rather the sodium bicarbonate is prepared in situ in a desired concentration shortly before the dialysate liquid contacts the dialysis membrane.

The formulation of sodium bicarbonate by the reaction of sodium carbonate with hydrochloric acid or acetic acid is a well known chemical reaction which proceeds by the following equations:

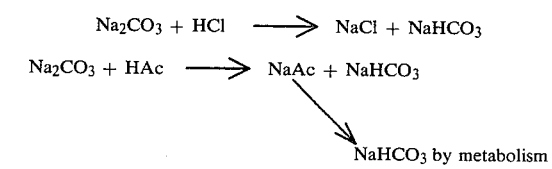

Aqueous acetic acid solutions and aqueous hydrochloric acid solutions are bacteriostatic and self-sterilizing, and therefore contaminant-free prior to blending with the sodium carbonate solution.

It has also been discovered that, as long as the pH is in excess of 7.6, the reaction between sodium carbonate and hydrochloric acid to produce sodium bicarbonate is relatively slow as compared to the rate of reaction between sodium carbonate and calcium chloride (commonly included in dialysate fluid) to produce calcium carbonate. Thus any temporary or localized excess of sodium carbonate produces insoluble calcium carbonate particles which are undesirable in the dialysate fluid.

BRIEF DESCRIPTION OF THE DRAWING

The FIGURE is a semi-schematic representation of a flow system designed to provide two reaction stages between the aqueous sodium carbonate and the hydrochloric acid and to substantially prevent the formation of calcium carbonate precipitate when the reactants are mixed.

DETAILED DESCRIPTION OF THE INVENTION

As shown in the FIGURE, the flow of both the sodium carbonate solution and the acidic solution is from left to right.

To generate a bicarbonate-containing dialysate containing about 35 milliequivalents of sodium bicarbonate per liter an aqueous sodium carbonate solution (about 3.8 g/liter) from a source not shown is flowed through line 11 at the rate of about 500 ml/min. with a portion thereof, preferably about 450 ml/min. passing upwardly through line 12 into reservoir 13 and another portion, preferably about 50 ml/min. continuing through line 14 and then upwardly through line 16 into reservoir 17. Valves 18 and 19 in lines 12 and 16, respectively, are used to balance the flow of aqueous sodium carbonate solution into the two reservoirs preferably in a ratio of about 9:1.

The sodium carbonate solution passing through line 12 into reservoir 13 passes first into sparger 21 comprising a tube, centrally located in the reservoir, closed at its upper end and containing side perforations which propel incoming solution into the body of fluid contained in the reservoir. Reservoir 17 contains a similar sparger 22 for similar introduction of the sodium carbonate solution from line 16.

The aqueous acidic solution, containing hydrochloric acid (about 1.4 N) and other dialysate components (as described below) is introduced through the closed upper end of reservoir 13 through line 23 at a flow rate of about 14 ml/min. The flow of acid through line 23 is stoichiometric to the flow of sodium carbonate solution through line 11 but is in excess of that needed to convert all of the sodium carbonate flowing into reservoir 13 to sodium bicarbonate.

Under the conditions prevailing in reservoir 13, the half life of the sodium carbonate introduced therein is about 0.15 minutes. Reservoir 13 preferably is sized to provide a residence time of about one-half minute (or about three half-lives) for the aqueous sodium carbonate solution introduced therein and constitutes the first conversion stage. Thus, about 89 to 90% of the sodium carbonate introduced into reservoir 13 is converted to sodium bicarbonate before the bicarbonate-containing liquid stream flows out of reservoir 13 and into reservoir 17 through line 24.

The solution in reservoir 13 (first stage) remains acidic because some of the hydrochloric acid introduced remains unreacted. In a subsequent stage that includes reservoir 17, where the remaining, unreacted sodium carbonate portion is introduced, the residence time is about the same as in the first stage (reservoir 13) and further conversion of sodium carbonate to sodium bicarbonate takes place, preferably a further 10-fold reduction in the carbonate concentration. In this manner an overall conversion of sodium carbonate to sodium bicarbonate of about 98 to 99 percent is obtained. In the foregoing embodiment, under the conditions prevailing in reservoir 17 the pH never rises above about 7.4, and calcium carbonate is not formed in sufficient quantity to come out of solution.

The produced bicarbonate-containing dialysate is conveyed through line 26 to a suitable hemodialysis apparatus, not shown.

It will be understood that more than the two stages described above may be provided, if desired. It will also be understood that the desired residence time does not require the presence of well-defined holding vessels or reservoirs, but may be provided by an extended flow path such as in a coiled pipe. The average residence time in each carbonate conversion stage should preferably be at least about 0.45 to 0.6 minutes. Preferably, at least about 80% of the total sodium carbonate flow should be directed to the first stage and the remainder to each subsequent stage. In determining the residence time in each stage after the first stage the volume of the lines connecting the stages has to be taken into account, of course.

Under some conditions, the acidity in reservoir 13 may be sufficient to decompose some sodium bicarbonate and produce free carbonic acid in the reaction mixture. The amount of carbonic acid produced, however, is well below the solubility limit for carbon dioxide at ambient temperatures; and no carbon dioxide bubbles will form. Any carbonic acid in reservoir 13 will be converted back to sodium bicarbonate in reservoir 17 at the relatively higher pH prevailing therein.

Since sodium bicarbonate is the preferred alkalizing material for minimizing side effects during hemodialysis, in accordance with the Graefe et al. article discussed above the preferred acid solution for producing the dialysate is an aqueous hydrochloric acid solution which produces no sodium acetate. However, from the aforementioned chemical reactions it can be seen that acetic acid produces equimolar amounts of sodium bicarbonate and sodium acetate; and acetic and hydrochloric acid mixtures produce even less sodium acetate. Such solutions are therefore preferable to the sodium acetate-alkalized dialysate solutions now used inasmuch as the concentration of acetate ion in the dialysate is minimized or completely obviated. The use of a small amount of acetic acid in combination with hydrochloric acid is helpful, however, for adjustment of the desired bicarbonate ion concentration when using a standarized sodium carbonate stock solution. That is, in a standardized system for the dialysis of patients some of whom may require different levels of sodium bicarbonate, it may be advantageous to make up a standard sodium carbonate solution, which, after reaction with hydrochloric acid and suitable dilution, will produce the desired amount of sodium bicarbonate for the patients who have the minimum level requirement for bicarbonate ions. For patients with bicarbonate ion requirements above the minimum, the necessary difference in bicarbonate ion requirement can be supplied by substituting acetic acid for part of the hydrochloric acid while using the same standard sodium carbonate solution. The additional bicarbonate production from the same level of sodium carbonate is possible because, acetic acid can produce two bicarbonate ions from each molecule of sodium carbonate (one immediately and the other through metabolic action in the bloodstream) while hydrochloric acid produces only one.

For example, a minimum alkalizing level of 35 milliequivalents per liter of sodium bicarbonate may be taken as standard; and a level of sodium carbonate in a standard solution may be selected to produce 35 milliequivalents of sodium bicarbonate ion per liter when the sodium carbonate is diluted and then reacted with hydrochloric acid. For patients requiring minimum sodium bicarbonate levels the standard sodium carbonate solution would be reacted with an aqueous acid solution containing only hydrochloric acid.

For other patients who might require 40 milliequivalents of sodium bicarbonate per liter, for example, the additional five milliequivalents may be obtained from the same standard sodium carbonate solution by substituting acetic acid for the hydrochloric acid equivalent of five milliequivalents per liter. The substituted acetic acid will react with the sodium carbonate not only to produce immediately the same amount of sodium bicarbonate as the hydrochloric acid that it replaces (5 milliequivalents per liter) but it will also produce 5 milliequivalents per liter of sodium acetate which converts in the body to sodium bicarbonate. Thus, partial substitution of acetic acid for hydrochloric acid in a reaction with a standard minimum sodium carbonate solution increases the ultimate level of sodium bicarbonate to the extent of such substitution on a mol for mol basis. Alternatively, the addition of acetic acid can be dispensed with by increasing the amounts of hydrochloric acid and sodium carbonate that are reacted.

The remaining constituents of the dialysate fluid desired for proper electrolyte balance, e.g., NaCl, KCl, $CaCl_2$, $MgCl_2$, etc. may be dissolved in the concentrated acid-containing solution, or may be supplied as a third solution.

The dialysate is preferably provided to the membrane through a proportioning apparatus into which three liquids are directed as separate streams at controlled rates, namely (1) a stock sodium carbonate concentrate, (2) an acid concentrate containing the remaining dialysate solute constituents, and (3) tempered water. Preferably, the sodium carbonate concentrate and the tempered water are first combined; and the diluted sodium carbonate solution thus obtained is then combined with the acid concentrate.

The relative proportions and flow rates of the three liquid streams may be calculated and controlled by a suitable computer or microprocessor device; and the operation of the system may be monitored by a continuous reading of either the conductivity or the pH value of the final composite stream to the dialysis unit.

It has been determined that a sodium bicarbonate level of 35 milliequivalents per liter is suitable for patients having a minimal alkalizing requirement in their dialysate fluid. To obtain this level of sodium bicarbonate in the final dialysate solution (after reaction with hydrochloric acid and dilution), a standard concentrated sodium carbonate solution is prepared containing 1891 grams of sodium carbonate in a 4.5 U.S. gallon batch, i.e., containing 111 grams of sodium carbonate per liter of former solution, which is then diluted with tempered water in a water-to-concentrate volume ratio of about 28 to 1 prior to addition of the aqueous acid solution.

Suitable levels of hydrochloric acid and acetic acid in the acid-containing solution for patients requiring different levels of alkalizing bicarbonate are shown in the following Table.

| $HCO_3$ ions Required mEq/l of Dialysate | HCl (11.6 N) ml/l of Aqueous Acid Solution | HAc (17.4 N) ml/l of Aqueous Acid Solution |
| --- | --- | --- |
| 35 | 120 | 0 |
| 40 | 103 | 10 |
| 45 | 86 | 20 |
| 50 | 69 | 30 |

In some instances, it may be desirable to add hydrochloric acid in an amount that slightly exceeds the stoichiometric amount needed for conversion of sodium carbonate to sodium bicarbonate.

The remaining solute constituents of the dialysate solution as prescribed by the attending physician can be added to the acid-containing solution or can be provided to the dialysate as a stream of a separate solution.

In the case of a separate solution, for example, in each liter batch thereof, 6.45 grams of dissolved calcium chloride produces a calcium level of 3 milliequivalents per liter; 1.83 grams of dissolved magnesium chloride produces a magnesium level of 1 milliequivalent per liter; and potassium chloride dissolved in amounts of 0, 2.92, 5.85 and 8.76 grams produce potassium levels of 0, 1, 2 and 3 milliequivalents per liter, respectively. Typical sodium chloride levels in such a separate solution are 149.6, 155.7 and 161.1 grams per liter batch. In combination with the sodium from the aforementioned standard sodium carbonate solution providing 40 milliequivalents of bicarbonate ion, overall sodium levels of 130, 135 and 140 milliequivalents per liter, respectively, can be obtained.

Proper proportioning of the dialysate constituents during hemodialysis can be readily monitored by a conductivity sensor because the conductivities of the diluted sodium carbonate solution and the ultimate dialysate solution are sufficiently different at 37° C. (about 600 micromhos and about 13,000 micromhos, respectively) so that a failure of the system can be immediately detected and appropriate remedial measures can be implemented. It is preferred to use a pH monitor in conjunction with the conductivity sensor to insure that undiluted acid concentrate does not come in contact with the dialysis membrane.

Bacteriological testing of the aforementioned concentrated dialysate solutions indicates that these solutions will not support the life of microorganisms that can be potential contaminants, i.e., *Bacillus cereus, Pseudomonas stutzeri* as well as yeasts, molds, and members of Serratia and Staphylococcus. In particular, samples of the concentrated solutions were challenged by introducing about 1000 bacteria of a specific type and checking these samples periodically over a time period of several days. For each sample two types of control were also used. First a sample of nutrient broth was challenged with the same type and member of bacteria and periodically checked for growth to determine that the bacteria used in each instance were viable (a positive growth control). Additionally, an aliquot of each solution sample was left unchallenged but otherwise handled in the same manner as the challenged samples (a negative growth control).

Tests on aqueous solutions of sodium bicarbonate performed in the foregoing manner showed that such solutions will support the growth of yeasts, molds and Pseudomonas.

The present invention has been described with respect to the preferred embodiments, but those skilled in the art will understand that modifications and variations may be employed without departing from the essence of the invention.

We claim:

1. In a dialysis process in which blood is withdrawn from a patient, passed over one surface of a semipermeable membrane and returned to the patient in a purified state while an aqueous dialysate fluid containing dissolved sodium salts including sodium bicarbonate is passed over the opposite surface of said membrane, the improvement wherein said sodium bicarbonate is generated just prior to said passage over said membrane surface by the interaction of a stream of an aqueous solution containing dissolved sodium carbonate and a stream of an aqueous solution containing a dissolved acid of the group consisting of hydrochloric acid, acetic acid and mixtures thereof, said streams interacting in a first stage in which a stoichiometric excess of acid is provided and in at least one additional stage in which additional aqueous sodium carbonate solution is provided.

2. The process of claim 1 wherein said acid-containing solution contains other dialysate solute constituents, including sodium chloride, calcium chloride and magnesium chloride.

3. The process of claim 1 wherein said acid-containing solution and said sodium carbonate-containing solution are blended with a third aqueous solution which contains other dialysate constituents, including sodium chloride, calcium chloride and magnesium chloride.

4. The process of claim 1 wherein said sodium carbonate-containing solution and said acid-containing solution are blended in a proportioning apparatus.

5. The process of claim 1 wherein relative amounts of said acid-containing solution and said sodium carbonate-containing solution are controlled by monitoring the conductivity of the resulting combined stream.

6. The process of claim 1 wherein said sodium carbonate-containing solution contains a level of sodium carbonate which will produce about 35 milliequivalents of sodium bicarbonate per liter of dialysate solution after dilution and reaction with hydrochloric acid.

7. The process of claim 6 wherein said acid-containing solution contains hydrochloric acid as its sole acidic constituent.

8. The process of claim 6 wherein said acid-containing solution contains a mixture of hydrochloric acid and acetic acid.

9. The process of claim 1 wherein said first stage and said additional stage comprise reservoirs, each of which provides an average residence time for its liquid contents of at least one minute.

10. The process of claim 9 wherein substantially all of said solution containing acid is introduced into said first stage and wherein at least 80% of said sodium carbonate solution is introduced into said first stage and the remainder into a subsequent stage.

11. The process of claim 9 wherein sodium carbonate is introduced into each of said reservoirs through a centrally located sparger which directs the flow of the sodium carbonate feed outwardly into the reservoir contents in a plurality of streams.

* * * * *